United States Patent
Harvell et al.

(10) Patent No.: US 8,219,647 B2
(45) Date of Patent: *Jul. 10, 2012

(54) CONTENT DELIVERY NETWORK CACHE GROUPING

(75) Inventors: Bradley B. Harvell, Chandler, AZ (US); Nils H. McCarthy, Scottsdale, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,797

(22) Filed: Sep. 26, 2011

(65) Prior Publication Data

US 2012/0072527 A1   Mar. 22, 2012

Related U.S. Application Data

(63) Continuation of application No. 12/732,942, filed on Mar. 26, 2010.

(60) Provisional application No. 61/248,378, filed on Oct. 2, 2009.

(51) Int. Cl.
*G06F 15/16* (2006.01)

(52) U.S. Cl. ............ 709/219; 709/214; 709/238

(58) Field of Classification Search ............. 709/219, 709/214, 238

See application file for complete search history.

(56) References Cited

U.S. PATENT DOCUMENTS

| | | | |
|---|---|---|---|
| 6,785,704 B1* | 8/2004 | McCanne | 718/105 |
| 8,028,090 B2* | 9/2011 | Richardson et al. | 709/238 |
| 2002/0009079 A1* | 1/2002 | Jungck et al. | 370/389 |
| 2007/0025327 A1* | 2/2007 | Raciborski et al. | 370/351 |
| 2008/0071859 A1* | 3/2008 | Seed et al. | 709/203 |
| 2009/0248858 A1* | 10/2009 | Sivasubramanian et al. | 709/224 |
| 2009/0254661 A1* | 10/2009 | Fullagar et al. | 709/226 |

* cited by examiner

*Primary Examiner* — Jungwon Chang

(74) *Attorney, Agent, or Firm* — Kilpatrick Townsend & Stockton LLP

(57) ABSTRACT

One or more content delivery networks (CDNs) that deliver content objects for others is disclosed. Content is propagated to edge servers through hosting and/or caching. End user computers are directed to an edge server for delivery of a requested content object by a universal resource indicator (URI). When a particular edge server does not have a copy of the content object from the URI, information is passed along a hierarchy (to a parent server, grandparent server, and, eventually, an origin server) until the content object is found. The origin server may be hosted in the CDN or at a content provider across the Internet. Once the content object is located in the hierarchical chain, the content object is passed back down the chain to the edge server for delivery. Optionally, the various servers in the chain may cache or host the content object as it is relayed.

20 Claims, 7 Drawing Sheets

CONTENT DELIVERY NETWORK CACHE GROUPING

CROSS-REFERENCES TO RELATED APPLICATIONS

This is a continuation patent application which claims priority from U.S. patent application Ser. No. 12/732,942 filed on Mar. 26, 2010, which claims the benefit of U.S. Application No. 61/248,378 filed Oct. 2, 2009. The entire disclosures of all these applications are incorporated by reference in their entirety for all purposes.

BACKGROUND

This disclosure relates in general to content delivery networks and, but not by way of limitation, to serving content objects from edge server caches of a content delivery network.

Content delivery networks (CDNs) are in the business of delivering content for others. CDNs will either cache and/or host content for its customers. Efficiently delivering content for a large number of customers creates difficulty. It would not be practical to store every possible content object serviced by the CDN on every edge server. Often caches are used on the edge servers to store popular or important content at the edges of the CDN. Popular content is less likely to have delivery latency, while less popular content is more likely to take a longer time to locate and deliver.

In some cases, the content object is not available on the edge server. This situation is sometimes referred to as a cache miss. A universal resource locator (URL) provided to the CDN from a requestor is used to find the content with a cache miss. The content may be hosted internal to the CDN or with a content provider. Finding the content object can be time intensive and affect the quality of service (QoS) perceived by the requestor. This is especially true for content that cannot be located in the CDN and requires a request to an external origin server to find the content.

CDNs are typically comprised of a number of different locations that serve content from, so called points of presence (POPs). In some cases, these different POPs are interconnected using the Internet and/or private backbones. Content not found in one POP may be readily available from another POP. Even within a POP, there are typically a number of different edge servers that each fulfill requests for content. These different edge servers have different capabilities and different content in their cache. A cache miss at a particular edge server would be expensive in QoS terms to fulfill from another server or even outside the CDN.

SUMMARY

In one embodiment, one or more content delivery networks (CDNs) deliver content objects for others. Content is propagated to edge servers through hosting and/or caching. End user computers are directed to an edge server for delivery of a requested content object by a universal resource indicator (URI). When a particular edge server does not have a copy of the content object referenced in the URI, information is passed to another server, the ancestor or parent server to find the content object. There can be different parents servers designated for different URIs. The parent server looks for the content object and if not found, will go to another server, the grandparent server, and so on up a hierarchy within the group. Eventually, the topmost server in the hierarchy goes to the origin server to find the content object. The origin server may be hosted in the CDN or at a content provider across the Internet. Once the content object is located in the hierarchical chain, the content object is passed back down the chain to the edge server for delivery. Optionally, the various servers in the chain may cache or host the content object as it is relayed.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1:
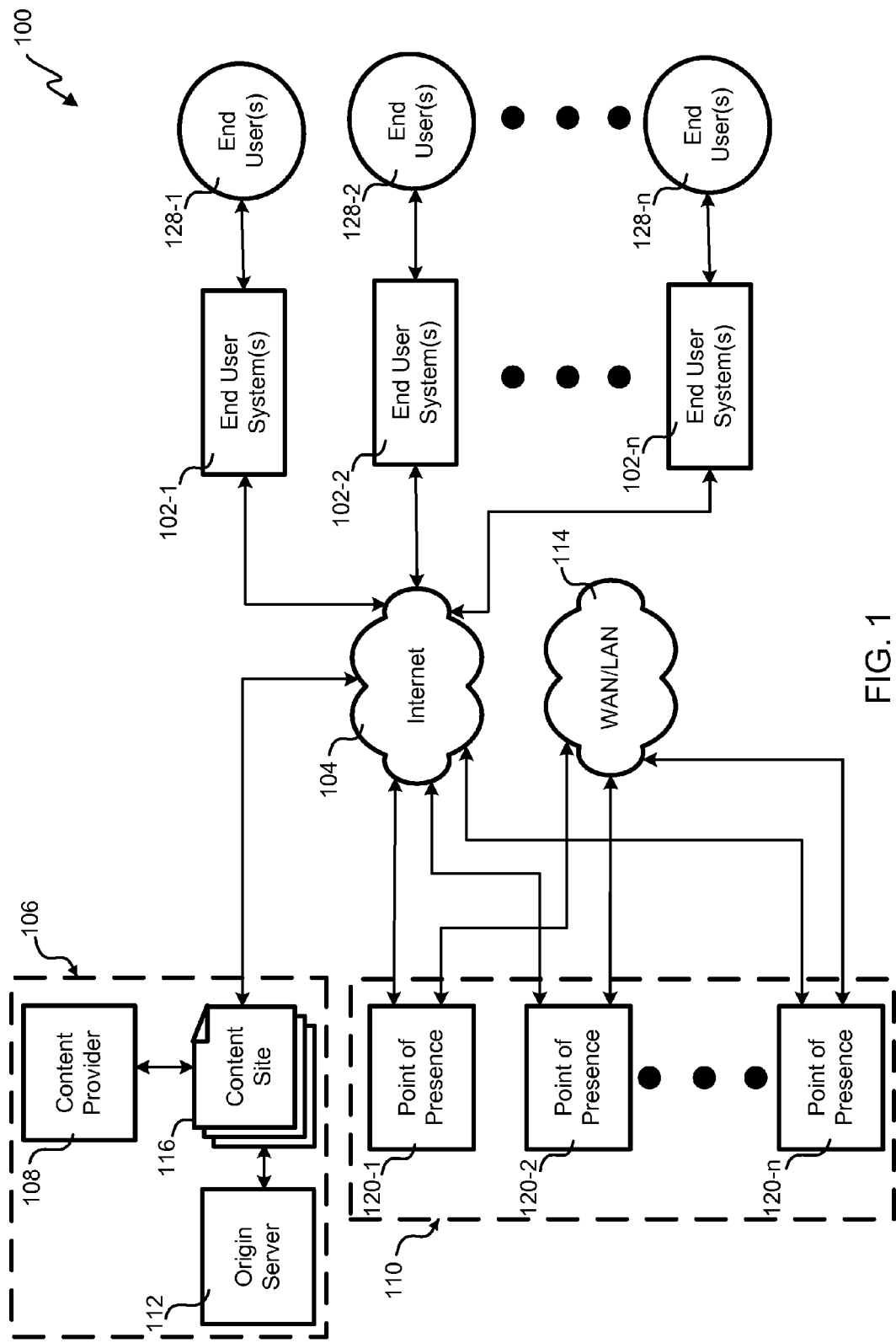
FIG. 1 depicts a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and includes a content provider 108, a content site 116, and an origin server 112. The CDN 110 can both cache and/or host content in various embodiments for third parties to offload delivery and typically provide better quality of service (QoS) to a broad spectrum of end user systems 102 distributed worldwide.

In this embodiment, the content distribution system 100 locates the content objects (or portions thereof) and distributes the content objects to an end user system 102. The content objects are dynamically cached within the CDN 110. A content object is any content file or content stream and could include, for example, video, pictures, data, audio, software, and/or text. The content object could be live, delayed or stored. Throughout the specification, references may be made to a content object, content, content stream and/or content file, but it is to be understood that those terms could be used interchangeably wherever they may appear.

Many content providers 108 use a CDN 110 to deliver the content objects over the Internet 104 to end users 128. The CDN 110 includes a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end user systems 102. Multiple POPs use the same IP address such that an Anycast routing scheme is used to find a POP likely to be close to the end user in a network sense for each request. In addition to the Internet 104, a wide area network (WAN) and/or local area network (LAN) 114 or other backbone may couple the POPs 120 with each other and also couple the POPs 120 with other parts of the CDN 110.

When an end user 128 requests a web page through its respective end user system 102, the request for the web page is passed either directly or indirectly via the Internet 104 to the content originator 106. The content originator 106 is the source or re-distributor of content objects. The content site 116 is an Internet web site accessible by the end user system 102. In one embodiment, the content site 116 could be a web site where the content is viewable with a web browser. In other embodiments, the content site 116 could be accessible with application software other than a web browser. The content provider 108 directs content requests to a CDN 110 after they are made or formulates the delivery path by embedding the delivery path into the universal resource indicators (URIs) for a web page. In any event, the request for content is handed over to the CDN 110 in this embodiment by using an Anycast IP address corresponding to two or more POPs 120.

Once the request for a content object is passed to the CDN 110, the request is associated with a particular POP 120 within the CDN 110 using the Anycast routing scheme. The particular POP 120 may retrieve the portion of the content object from the content provider 108. Alternatively, the content provider 108 may directly provide the content object to the CDN 110 and its associated POPs 120 through prepopulation, i.e., in advance of the first request. In this embodiment, the content objects are provided to the CDN 110 and stored in one or more CDN servers such that the portion of the requested content may be hosted from the CDN 110. The CDN servers include edge servers in each POP 120 that actually serve end user requests. The origin server 112 holds a copy of each content object for the content originator 106. Periodically, the content of the origin server 112 may be reconciled with the CDN 110 through a cache, hosting and/or pre-population algorithm. Some content providers could use an origin server within the CDN 110 to host the content and avoid the need to maintain a copy.

Once the content object is retrieved, the content object is stored within the particular POP 120 and is served from that POP to the end user system 102. The end user system 102 receives the content object and processes it for use by the end user 128. The end user system 102 could be a personal computer, media player, handheld computer, Internet appliance, phone, IPTV set top, streaming radio or any other device that receives and plays content objects. In some embodiments, a number of the end user systems 102 could be networked together. Although this embodiment only shows a single content originator 106 and a single CDN 110, it is to be understood that there could be many of each in various embodiments.

Figure 2:
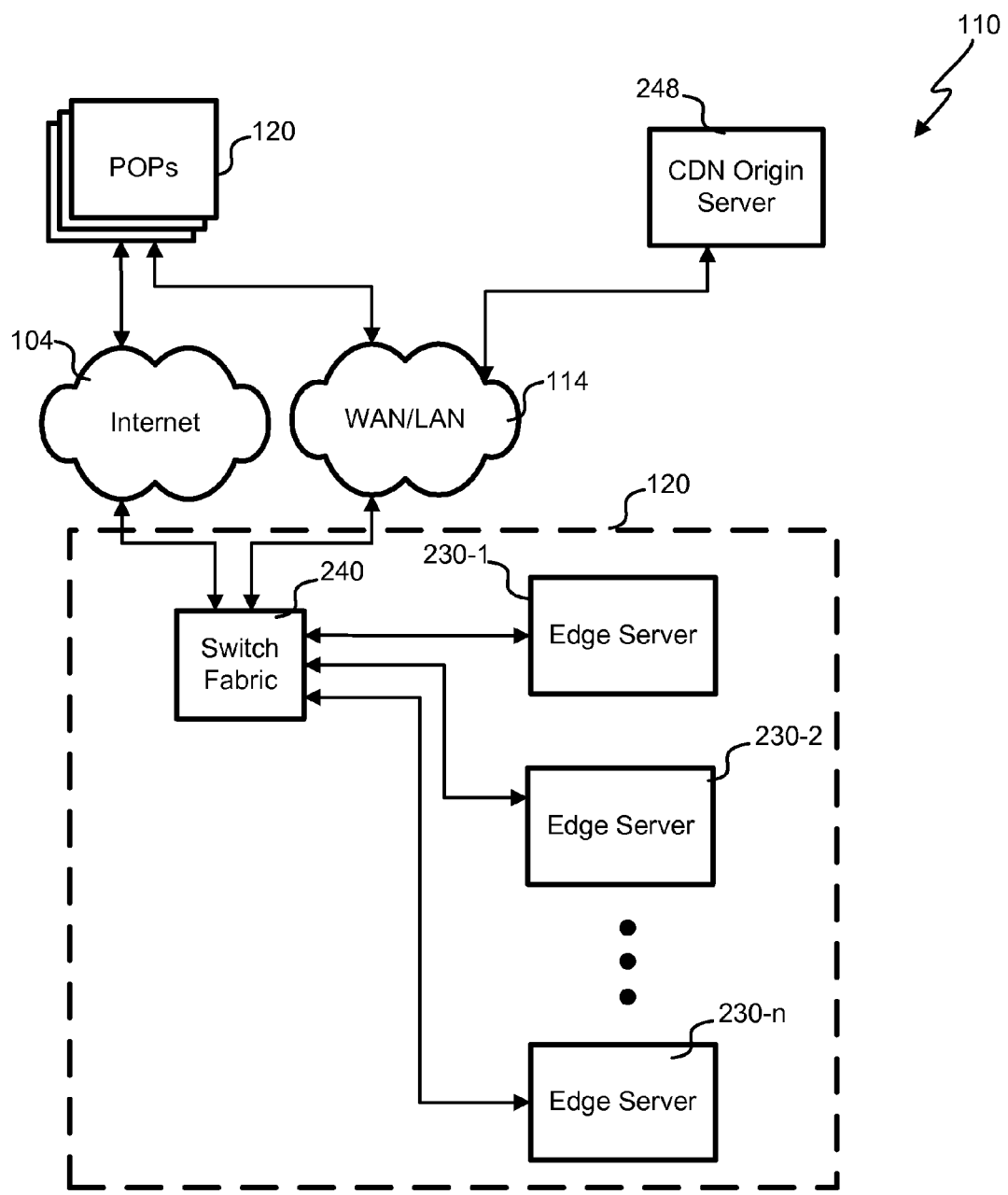
FIG. 2 depicts a block diagram of an embodiment of a content delivery network (CDN)

With reference to FIG. 2, a block diagram of an embodiment of a CDN 110 is shown. Although only one POP 120 is shown in detail, there are a number of POPs 120 similarly configured throughout the CDN 110. The POPs communicate through a WAN/LAN 114 and/or the Internet 104 when locating content objects. An interface to the Internet 104 to the POP 120 accepts requests for content objects from end user systems 102. The request comes from an Internet protocol (IP) address in the form of a URI.

Switch fabric 240 assigns the request to one of the edge servers 230 according to a routing scheme such as round robin, load balancing, etc. In this embodiment, the switch fabric is aware of which edge servers 230 have what capabilities and assigns within the group having the capability to store and serve the particular content object referenced in the URI. A protocol such as cache array routing protocol (CARP) is used in this embodiment to disperse the URIs between the group of edge servers 230. Every time that a particular URI is requested from the group, it is assigned to the same edge server 230 using CARP. The caches gathered in a particular group as neighbors can be the other servers in the current POP, less loaded servers in the current POP, servers having the capability to process the content object, a subset of servers assigned to a customer using the CDN to serve the content object, or some other grouping of servers in the POP 120.

In another embodiment, the switch fabric 240 assigns the request to one of the edge servers 230, which performs CARP to either service the request or reassign it to a neighboring edge server 230. The switch fabric 240 sends each packet flow or request to an edge server 230 listed in the configuration of the switch fabric 240. This embodiment does not have awareness of the particular capabilities of any edge server 230. The assignment can be performed by choosing the edge server with the least amount of connections or the fastest response time, but the switch fabric in this embodiment assigns the packet flow somewhat arbitrarily using round robin or random methodologies. When the chosen edge server 230 receives the packet flow, an algorithm like CARP is used by the chosen edge server 230 to potentially reassign the packet flow between a group of edge servers to the one dictated by the algorithm. For example, the switch fabric 240 could choose a second edge server 230-2 being the next in the round robin rotation. The second edge server 230-2 would perform CARP on the request and find that the first edge server 230-1 is being assigned this type of request. The request would be reassigned to the first edge server 230-1 to fulfill.

In some cases, the CDN 110 is used to host content for others. Content providers 108 upload content to a CDN origin server 248. Although only one CDN origin server 248 is shown, it is to be understood that there could be many spread among a number of locations. The content object can be stored in the CDN origin server 248. The CDN origin server 248 serves the content object within the CDN 110 to various edge servers 230 in various POPs 120. After the content provider 108 places a content object on the CDN origin server 248 it need not be hosted on the origin server 112 redundantly.

Requests from end user systems 102 are assigned to an edge server 230 that may cache the requested content object. On occasion, the edge server 230 receiving a request does not have the content object stored for immediate serving. This so-called "cache miss" triggers a process within the CDN 110 to effectively find the content object (or portion thereof) while providing adequate QoS. The content may be found in neighboring edge servers in the same POP 120, in another POP 120, in a CDN origin server 248, or even an external origin server 112. The various edge and origin servers 230, 248 are grouped for various URIs uniquely. In other words, one URI may look to one group of servers 230, 248 on a cache miss while another URI will look to a different group of servers 230, 248.

Figure 3:
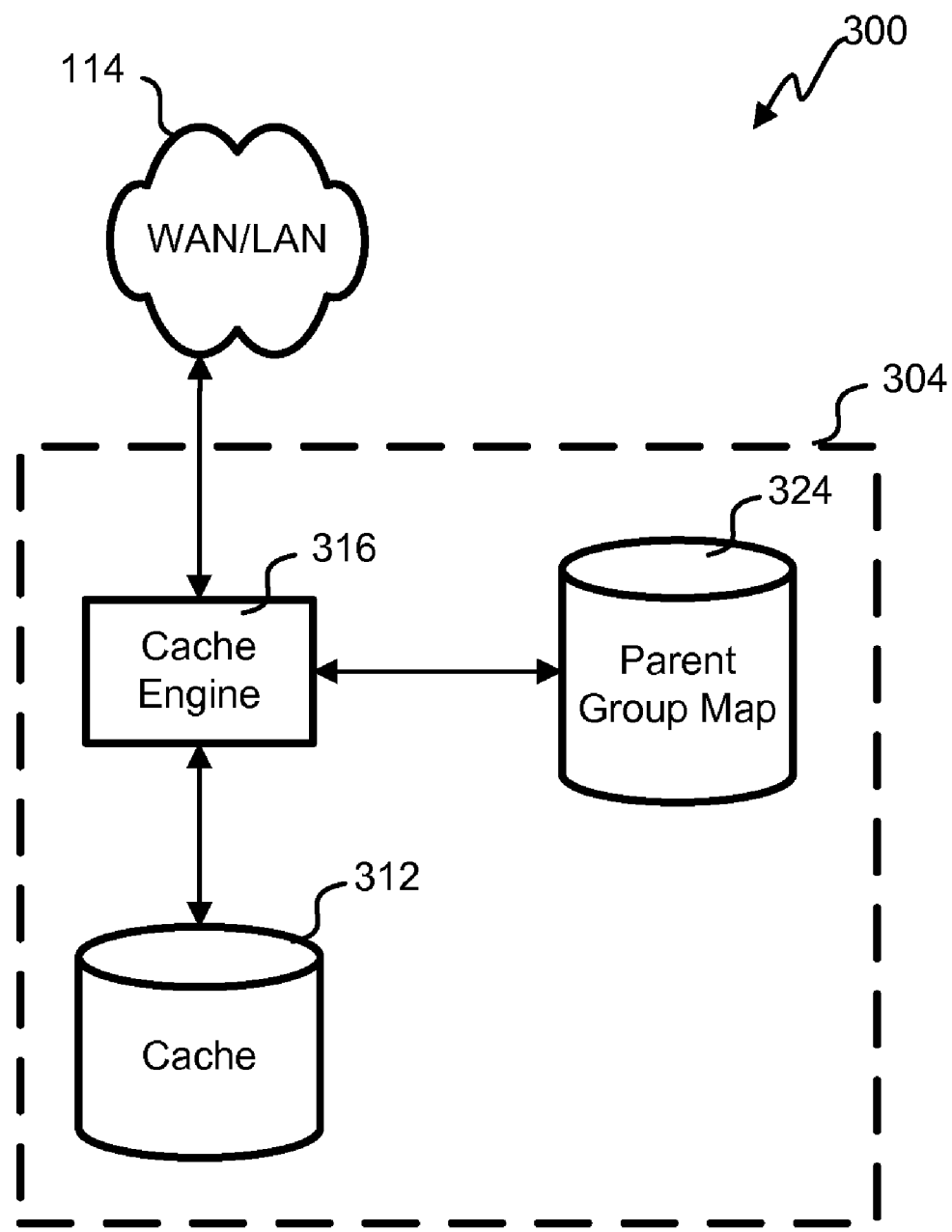
FIG. 3 depicts a block diagram of an embodiment of a portion of a content delivery network (CDN) that includes a server coupled to a CDN network.

Referring first to FIG. 3, an embodiment of a portion 300 of a content delivery network (CDN) that includes an edge and/or origin server 304 coupled to the WAN/LAN 114 is shown. The server could be an edge server, a host server or any other server that can supply content objects. It may be at the bottom of a hierarchy or a topmost position of the hierarchy within the CDN. Although this embodiment shows the server 304 as operating as a cache, the content objects could be sticky within the cache such that the server 304 can also act as a host. Indeed, all the content on the server 304 maybe hosted in one embodiment.

Each server 304 in a CDN 110 can belong to any number of groups. The grouping defines where content in the universal resource indicators (URIs) will be searched when not found at a particular server 304. When the server 304 cannot find a content object that is requested, it will go to the WAN/LAN 114 or another network to find the content object so long as all options within the CDN are not exhausted. The URIs may or may not belong to a group, but when they do, a particular ancestor server will be handed the URI for fulfillment after a cache miss that is potentially different from ancestor servers for other groups. At the top of any hierarchy of lookup tree, a server 304 experiencing a cache miss may go to the Internet rather than the WAN/LAN 114 to obtain a content object from an origin server of the content provider. The server 304 includes a cache engine 316, a parent group map 324, and a cache 312.

The cache engine 316 receives the URI or request for content to fulfill the request by serving the content object to the end user or server down the lookup tree. The cache engine 316 checks the cache 312 for the content object. Where there is a cache miss, the cache engine 316 finds the ancestor server to check for the content object. The cache engine 316 receives the group variable that is derived from the original URI or can derive a tree of ancestor caches from the URI itself.

In one embodiment, a universal resource indicator (URI) is requested and indicates a content object and optionally a group variable. In another embodiment, the group variable is not expressly within the URI, but the URI can be correlated to ancestor caches or groups using a lookup table. Optionally, the URI can also include a path, origin location, variable(s), a prefix, etc. In some form, the URI is passed to various servers in an attempt to find a requested content object. It is to be understood that when the term URI is used, it doesn't necessarily require any format and just conveys at least where to find a content object and the file or stream name. The URI either has the group variable or can be otherwise correlated to parent cache(s) or host. For example, ACME.llnw.net/videos/sports/game.mov?lex5 is a URI with an ACME prefix, a llnw.net domain, a videos/sports path, a game.mov filename, and a lex5 group variable. The URI itself, the ACME prefix and/or lex5 in this example could be used by servers to look-up where to look for a content object when not found locally.

TABLE I

| URI Grouping | |
| --- | --- |
| Prefix | Ancestor Server POP |
| ACME.llnw.net | San Jose |
| Smith.llnw.net | Dallas |

TABLE I-continued

| URI Grouping | |
| --- | --- |
| Prefix | Ancestor Server POP |
| ShoeExpress.llnw.com | Phoenix |
| Vinex.llnw.com | San Jose |
| SDDT.llnw.com | Denver |

The URI grouping happens because each server is aware of its ancestor server to use for each URI. The net effect of each server knowing the ancestor server to refer to is to have a hierarchical tree that defines the group. Table I is an example of grouping that could be stored in the parent group map 324. When a URI containing the ACME prefix is not found in a server, the request is relayed to the San Jose POP 120 where it is assigned to another server for fulfillment.

Grouping can be used to provide different levels of QoS. Table II shows sub-groups for a particular prefix that can be used to specify a sub-group of servers within a POP 120. For example, the ACME customer designated with the ACME prefix in the URI may offer end user systems 102 three possible levels of QoS. ACME could charge different rates for the various levels of QoS. The Q1 URI variable would specify the fastest servers with the largest caches in the most favorable POP 120. The Q2 variable would assign a lower caliber of server in the most favorable POP 120. User systems 102 presenting the Q3 variable would be assigned a less favorable POP when the content object is not found.

TABLE II

| URI QoS Sub-Grouping | |
| --- | --- |
| Prefix | Ancestor Server POP |
| ACME . . . Q1? | San Jose - Edge Group A |
| ACME . . . Q2? | San Jose - Edge Group B |
| ACME . . . Q3? | Denver |

Each server looks to the variable from the URI to determine the next ancestor server up the hierarchy to query to when a content object is not located locally. Where there is no ancestor cache for a URI, each server has a default hierarchy to find ancestor caches. There can be any number of possible servers up the hierarchy specified by any number of URIs. In effect, the group variable or URI defines a tree that will specify a flow that ultimately ends in an origin server or host somewhere. These trees can be selected differently for a number of URIs rather than relying on some default lookup tree.

The parent group map 324 stores at least one ancestor server location for each group variable or URI string. If there is no ancestor server specific to the particular group variable or URI, a default ancestor server can be used. In any event, the parent group map 324 returns ancestor server locations or addresses to the cache engine 316. For example, a parent cache and grandparent cache would be returned for a particular URI or group variable. Should the parent cache not respond for whatever reason, the grandparent cache would be queried. The parent group map 324 can be a database or look-up table that is populated by the CDN to implement a lookup tree.

The cache engine 316 requests the content object from the parent server or grandparent server. Once the ancestor server responds, it will find the content object locally or will look to its ancestor servers. This cycle can repeat many times through various levels in a hierarchy to ultimately find the content object. The content object is relayed back down the hierarchy to the cache engine 316 that places the content object in the cache 312 as the content object is passed to the end user or down the hierarchy.

Although this embodiment uses a chained approach to finding a server with the content object, other embodiments could use a star approach. In the star approach, the edge server receiving the URI would hold the entire lookup tree in its parent group map 324. The higher levels in the hierarchy could be successively queried for the content object. Those queries could be done overlapping in time to speed the lookup process. The content object is provided directly from the server higher in the hierarchy without involving every level in the hierarchy. The servers at various levels in the hierarchy could decide to store the content object or not in various embodiments.

Figure 4A:
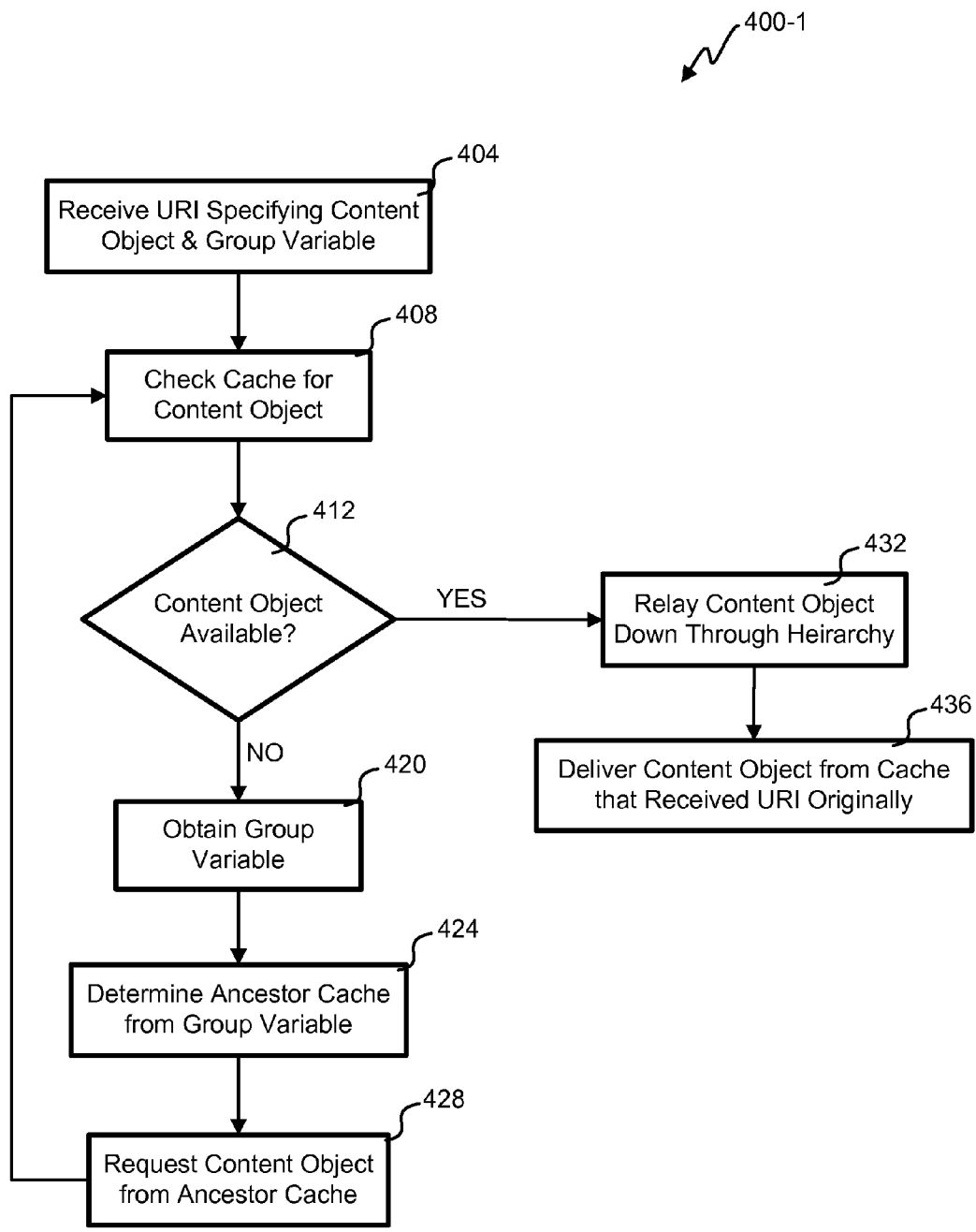
FIGS. 4A, 4B and 4C illustrate flowcharts of embodiments of a process for finding a content object through various hierarchies.

With reference to FIG. 4A, a flowchart of an embodiment of a process 400-1 for finding a content object through various hierarchies is shown. On a URI-by-URI basis, the lookup tree can change. The depicted portion of the process begins in block 404 where the edge server receives a URI. The URI indicates an address that was used to find the edge server, a group variable and information to find the content object along with other information. Initially, the edge server checks its cache 312 for the content object.

In block 412, it is determined if the content object is available in the edge server 412. We will cover the scenario where it is not found initially by progressing to block 420. The group variable is obtained from the URI or it might be passed by a prior server lower in the hierarchy. The ancestor server is determined by referencing the parent group map 324 in block 424 with the group variable value. Although not shown, one or more back-up ancestor servers could be queried if the ancestor server does not respond. In block 428, the content object is requested from the ancestor server determined in block 424. Next, processing loops back to block 408 to see if the next higher server in the lookup tree has the content object. These iterations continue until the content object is found in block 412.

Should the content object be found in the present iteration or in the higher levels in the hierarchy of the lookup tree in block 412, processing continues to block 432. In the simple case, the edge server has the content object already before ever going through the loop. Where that is not the case, the content object is relayed down through the hierarchy from the server that had the content object to the edge server in block 432. Each server in that chain may cache or otherwise store the content object. In block 436, the edge server that originally received the request for the content object serves the content object through a stream or download to an end user.

Figure 4B:
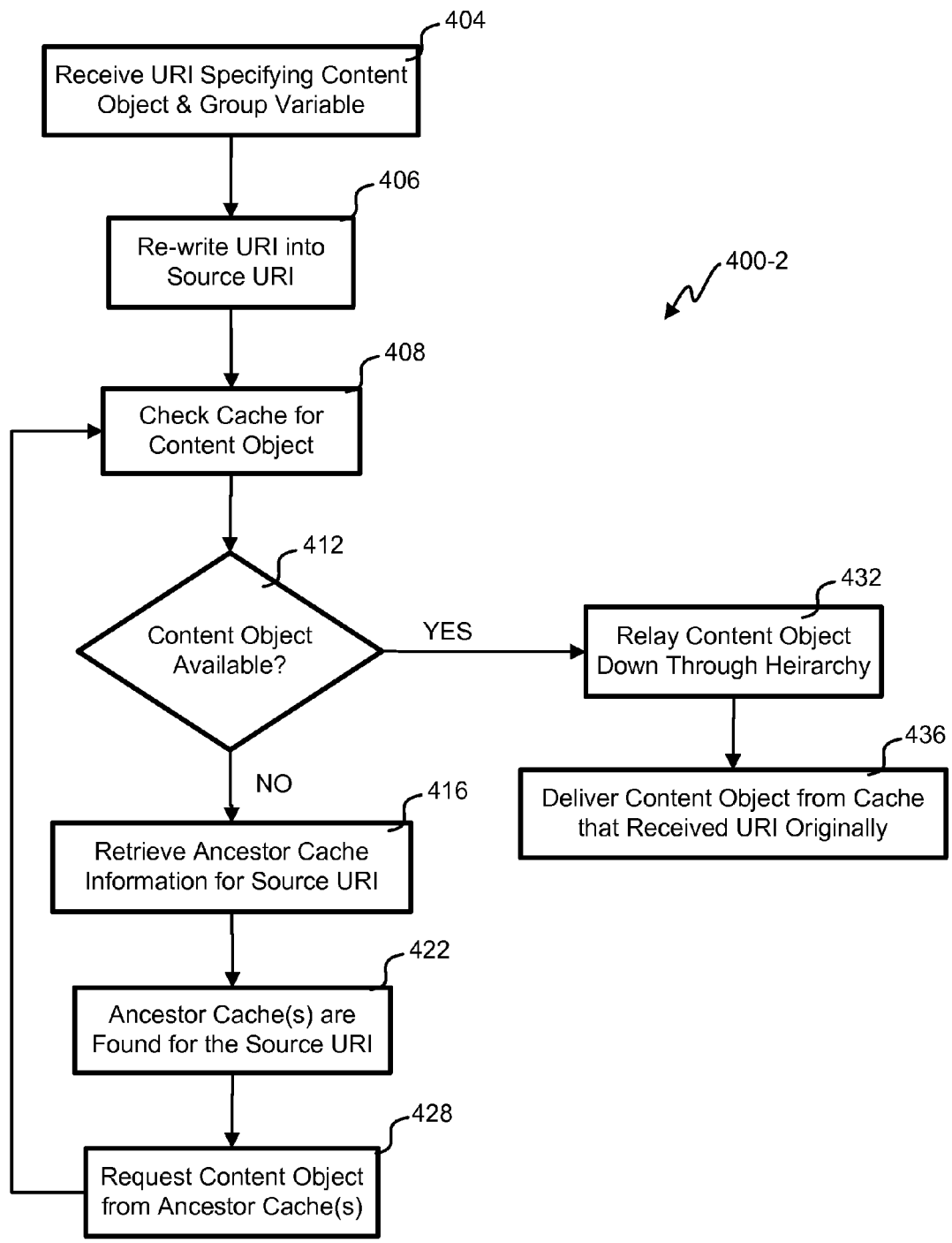

With reference to FIG. 4B, a flowchart of another embodiment of a process 400-2 for finding a content object through various hierarchies is shown. The depicted portion of the process 400-2 begins in block 402 where a URI request is received an edge server at the POP that specifies a content object. The URI is rewritten in block 406. There may be many different versions of a URI that correspond to a single content object. A look-up table is used to match as much of the URI as possible to an authoritative name or source URL. The caches store content objects based upon the source URL, which points to an origin server that can be used to retrieve a content object not in the CDN.

It is determined in block 408 if the edge server receiving the request has the content object available locally. In block 412, a determination is made if the content object is available and processing continues to block 432 and 436 if the content object is within the edge server cache in the same manner as the embodiment of FIG. 4A.

Should the content object not be in the cache of the edge server as determined in block 412, processing continues to block 416. During the rewrite process of block 406, many parameters such as the ancestor cache(s) are retrieved for the source URL and retrieved for use in block 416. The ancestor cache(s) is the start of a potentially iterative process that defines the tree of the cache group. In block 422, ancestor caches are found using the parameters associated with the source URL. As each source URLs could have different ancestor caches, different cache groups form on a URI-by-URI basis. The cache group is a function of the POP receiving the request and ancestor cache preferences for each source URI.

The ancestor cache for a particular URI may be chosen for any number of reasons. Which ancestors are used may adjust on a server, POP-wide or CDN-wide basis with periodic (e.g., hourly, daily, weekly, monthly, or some other period) or real-time updates that react to health and loading of particular servers and POPs. An ancestor may be chosen based upon whether the content is hosted and/or cached in the CDN, the capability of a server to stream or process different content objects with different media types, loading of a server, a server going down, a server having health problems, loading of network connections of a server, or other issues that would affect the suitability of a particular ancestor server temporarily or permanently. For example, a data connection between a cache and an ancestor cache may be overloaded and the ancestor cache would change to one that was suitable.

A table or database stores ancestor cache information for each source URL or group of source URLs. Typically, there is a primary ancestor and at least one back-up should the primary not respond for whatever reason. In block 428, the source URI is requested of the primary ancestor cache and any back-up ancestor caches, if necessary. Processing then loops back to block 408 to repeat block 412, 416, 422, and 428 in a loop to work through the hierarchy. Although not shown, the highest level in the hierarchy would refer to the origin server to retrieve the content object.

Figure 4C:
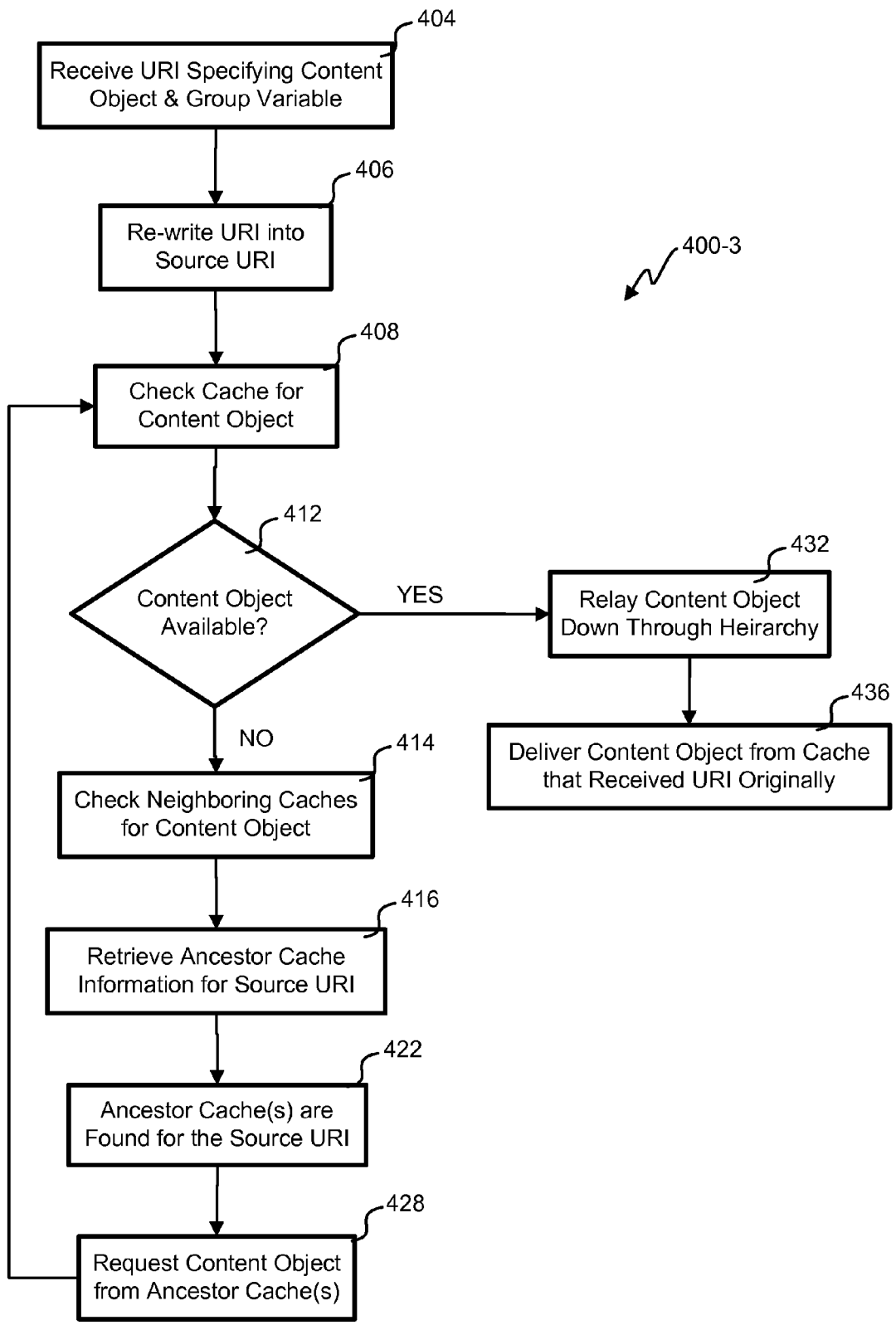

With reference to FIG. 4C, a flowchart of another embodiment of a process 400-3 for finding a content object through various hierarchies is shown. This embodiment is similar to the embodiment of FIG. 4B, but adds a block 414 between blocks 412 and 416. In block 414, neighboring servers are searched for the content object before resorting to an ancestor cache out side those neighbors. The neighboring servers could be a group of the entire POP 120 or a sub-group of the servers within the POP 120. The serving of the content object may be reassigned to the server holding the content object or may be relayed or proxied to the server currently assigned to serve the content in various embodiments.

Figure 5:
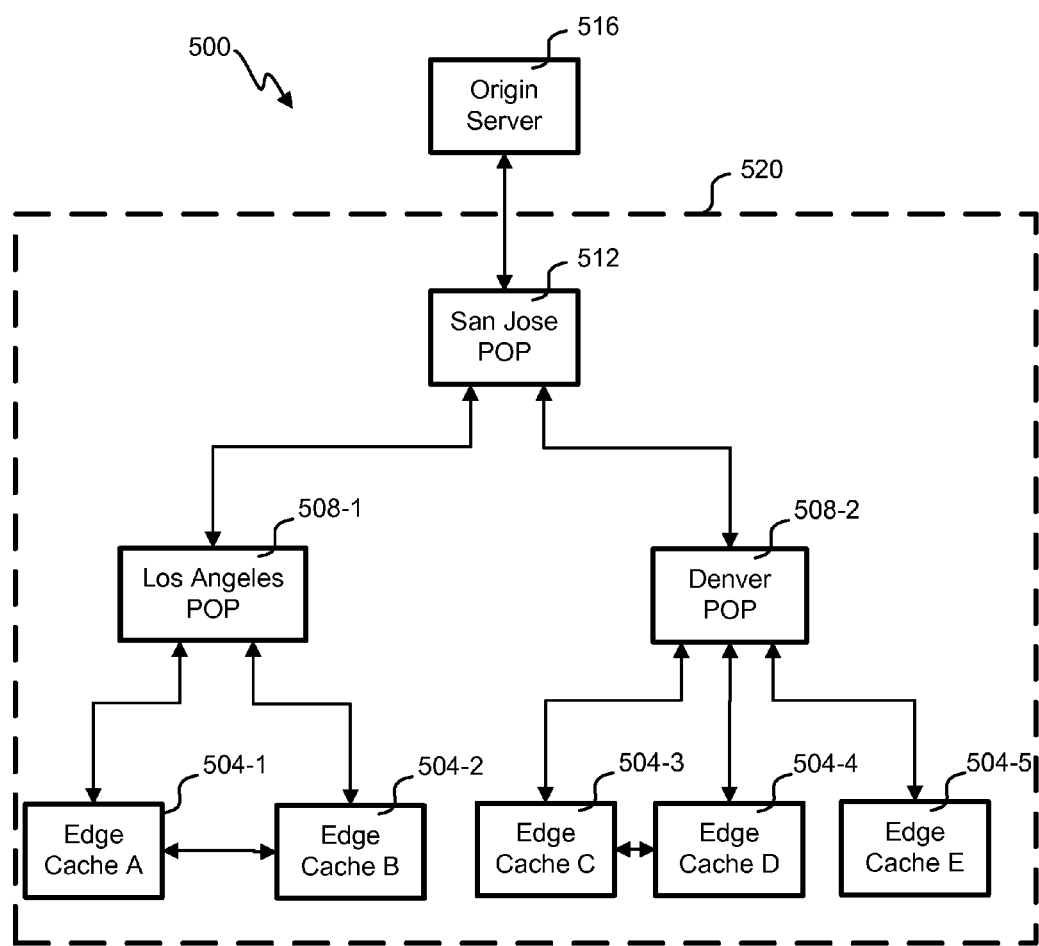
FIG. 5 depicts a block diagram of an embodiment of a lookup tree.

Referring to FIG. 5, a block diagram of an embodiment of a lookup tree 500 is shown. This lookup tree 500 is simplified as there could be hundreds or thousands of blocks on the lookup tree for a CDN. Embodiments could have different lookup trees 500 for different customers, content formats, digital rights management, delivery methods, end user Internet service providers, bitrates, loading levels, etc. This embodiment shows three levels of hierarchy within the CDN 520 prior to requesting a content object an external origin server 516. By loading the parent group maps 324 for all the servers in the lookup tree 500 will organize the hierarchy for a particular group variable.

In the first level of the hierarchy for the lookup tree 500, there are five edge servers 504 that cache content objects. The edge servers 504 could be distributed around the Internet in different ways. For example, edge cache A and B 504-1, 504-2 could be in the same POP or in different POPs. When a request goes edge cache A 504-1 and cannot be fulfilled internally, edge cache B 504-2 is checked next for the content object. Should the content object not be found in edge cache B 504-2, the request would go to another POP in Los Angeles 508-1. One or all the caches in the Los Angeles POP 508-1 would be queried for the content object.

Should the Los Angeles POP 508-1 not have the content object, it would query the POP having the San Jose POP 512. If not found in the San Jose POP 512, a server of the San Jose POP 512 would go back to the origin server 516 to retrieve the content object. In another embodiment, the CDN 520 hosts the content objects to serve as the origin server 516.

In another example, the content object request starts with edge cache D 504-4. If not found there, a request would be made by edge cache D 504-4 to edge cache C 504-3, but not to edge cache E. For example, edge cache E may be in a different location or not suited to store and serve the content object. Should the content object not be found in edge cache C, the Denver POP 508-8 would be queried by edge cache C. If not found, the next request goes from the Denver POP 508-8 to the San Jose POP 512. Finally, the origin server 516 would be queried if the content object is not found in the San Jose POP 512.

In some cases, the search for a server with the content object can get caught in a loop. A misconfiguration in the parent group maps 324 could cause this problem perhaps as a update to the lookup tree 500 is partially rolled out. When a server receives a request for the content object from another server, the server checks to see if in the chain of servers relaying the request the receiving server is already listed. This would indicate a loop had developed. The loop could be broken by referring the request to another POP or even to the origin server, for example.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the disclosure.

What is claimed is:

1. A method to cache content objects in a content delivery network (CDN) according to an arrangement of using different parent caches for different URIs, the method comprising:
   receiving a first universal resource indicator (URI) at a cache of an edge server in a first points of presence (POP), wherein the first URI specifies a first content object;
   determining that the cache does not hold the first content object;
   analyzing the first URI to determine a first hierarchical tree of caches, the first hierarchical tree of caches having a plurality of levels of caches to successively receive content-object requests upon cache misses at previous levels, the first hierarchical tree of caches comprising the first parent cache;
   requesting the first content object from the first parent cache in a second POP;
   receiving a second URI at the cache of the edge server in the first POP, wherein the second URI specifies a second content object;
   determining that the cache does not hold the second content object;
   analyzing the second URI to determine a second hierarchical tree of caches, the second hierarchical tree of caches having a plurality of levels of caches to successively receive content-object requests upon cache misses at previous levels, the second hierarchical tree of caches comprising the second parent cache different from the first parent cache, wherein the second parent cache is in the first POP; and
   requesting the content object from the second parent cache.

2. The method to cache content objects in the CDN according to the arrangement of using different parent caches for different URIs as recited in claim 1, wherein the first URI is from a first request for the first content object, further comprising:
   analyzing the first request to determine if the cache has received the first request from a loop,
   determining a third parent cache different from the first parent cache, and
   requesting the first content object from the third parent cache should the loop be determined.

3. The method to cache content objects in the CDN according to the arrangement of using different parent caches for different URIs as recited in claim 1, further comprising:
   analyzing the first URI; and
   choosing the first hierarchical tree of caches from a plurality of hierarchical tree of caches based upon the analysis of the first URI.

4. The method to cache content objects in the CDN according to the arrangement of using different parent caches for different URIs as recited in claim 1, further comprising:
   determining that the first parent cache does not hold the first content object;

determining a first grandparent cache from the URI, the first grandparent cache being in the first hierarchical tree of caches; and requesting the first content object from the first grandparent cache.

5. The method to cache content objects in the CDN according to the arrangement of using different parent caches for different URIs as recited in claim 4, further comprising:

determining that the second parent cache does not hold the second content object;

determining a second grandparent cache from the URI, the second grandparent cache being in the second hierarchical tree of caches; and requesting the second content object from the second grandparent cache.

6. The method to cache content objects in the CDN according to the arrangement of using different parent caches for different URIs as recited in claim 1, wherein:

the analysis of the first URI comprises identifying a first level of quality of service, and the analysis of the second URI comprises identifying a second level of quality of service, the second and first levels being different.

7. The method to cache content objects in the CDN according to the arrangement of using different parent caches for different URIs as recited in claim 1, wherein the first URI and the second URI include information corresponding to a level of quality of service, and wherein the first and second POPs are associated with different levels of quality of service.

8. A CDN for caching content objects according to a selectable arrangement of separate caches, the CDN comprising:

a plurality of POPs;

a plurality of edge servers distributed among the plurality of POPs, wherein the plurality of edge servers comprise a plurality of caches; and a cache parent determining function that receives a plurality of URIs specifying a plurality of content objects for delivery to end user computers, wherein:

the plurality of URIs include information that allows selecting from the plurality of caches that would serve as a parent cache to find the content object should a cache, previously assigned the content object, not have the content object, and different URIs have different parent caches, wherein:

the plurality of URIs include a first URI and a second URI;

both the first URI and second URI are received at a same POP;

the first URI has a first hierarchical tree of caches in multiple POPs;

the second URI has a second hierarchical trees of caches in multiple POPs; and the first hierarchical tree is different from the second hierarchical tree.

9. The CDN for caching content objects according to the selectable arrangement of separate caches as recited in claim 8, wherein the parent cache is changed to another parent cache based upon loading of the parent cache.

10. The CDN for caching content objects according to the selectable arrangement of separate caches as recited in claim 8, wherein the plurality of POPs are located in a plurality of different geographic locations.

11. The CDN for caching content objects according to the selectable arrangement of separate caches as recited in claim 8, wherein the first URI and second URI correspond to different content objects.

12. The CDN for caching content objects according to the selectable arrangement of separate caches as recited in claim 8, wherein the URI is a portion of a URI.

13. The CDN for caching content objects according to the selectable arrangement of separate caches as recited in claim 8, wherein content objects can each be specified as sticky or ephemeral in the plurality of caches to optionally host or cache content objects.

14. The CDN for caching content objects according to the selectable arrangement of separate caches as recited in claim 8, wherein:

according to the first hierarchical tree, a cache in a second POP is ranked above a cache in the same POP at which the first URI and second URI are received, and according to the second hierarchical tree, the cache in a first POP is not ranked above the cache in the same POP at which the first URI and second URI are received.

15. A method for caching content objects according to a selectable arrangement of separate caches of a CDN, the method comprising:

receiving a first URI at a cache of an edge server in a first POP, wherein the first URI specifies a first content object;

determining that the cache does not hold the first content object;

analyzing the first URI to determine a first hierarchical tree of caches, the first hierarchical tree of caches having a plurality of levels of caches to successively receive content-object requests upon cache misses at previous levels, the first hierarchical tree of caches comprising the first parent cache;

requesting the first content object from the first parent cache in a second POP;

receiving a second URI at the cache of the edge server in the first POP, wherein the second URI specifies a second content object;

determining that the cache does not hold the second content object;

analyzing the second URI to determine a second hierarchical tree of caches, the second hierarchical tree of caches having a plurality of levels of caches to successively receive content-object requests upon cache misses at previous levels, the second hierarchical tree of caches comprising the second parent cache different from the first parent cache, wherein the second parent cache is in the first POP; and requesting the content object from the second parent cache.

16. The method for caching content objects according to the selectable arrangement of separate caches as recited in claim 15, wherein the first URI is from a first request for the first content object, further comprising:

analyzing the first request to determine if the cache has received the first request from a loop, determining a third parent cache different from the first parent cache, and requesting the first content object from the third parent cache should the loop be determined.

17. The method for caching content objects according to the selectable arrangement of separate caches as recited in claim 15, further comprising:

analyzing the first URI; and choosing the first hierarchical tree of caches from a plurality of hierarchical trees of caches based upon the analysis of the first URI.

18. The method for caching content objects according to the selectable arrangement of separate caches as recited in claim 15, further comprising:
- determining that the first parent cache does not hold the first content object;
- determining a first grandparent cache from the URI, the first grandparent cache being in the first hierarchical tree of caches; and
- requesting the first content object from the first grandparent cache.

19. The method for caching content objects according to the selectable arrangement of separate caches as recited in claim 18, further comprising:
- determining that the second parent cache does not hold the second content object;
- determining a second grandparent cache from the URI, the second grandparent cache being in the second hierarchical tree of caches; and
- requesting the second content object from the second grandparent cache.

20. The method for caching content objects according to the selectable arrangement of separate caches as recited in claim 15, wherein:
- the analysis of the first URI comprises identifying a first level of quality of service, and
- the analysis of the second URI comprises identifying a second level of quality of service, the second and first levels being different.

* * * * *